United States Patent [19]

Lovely

[11] 3,961,362
[45] June 1, 1976

[54] DYNAMIC HUE CONTROL NETWORKS
[75] Inventor: John D. Lovely, Waterloo, Canada
[73] Assignee: Electrohome Limited, Kitchener, Canada
[22] Filed: Apr. 11, 1975
[21] Appl. No.: 567,060

[52] U.S. Cl. .................................................. 358/28
[51] Int. Cl.² ............................................ H04N 9/46
[58] Field of Search ....................................... 358/28

[56] References Cited
UNITED STATES PATENTS
3,755,617   8/1973   Ichida ................................. 358/28

Primary Examiner—Robert L. Richardson
Assistant Examiner—Mitchell Saffian
Attorney, Agent, or Firm—Sim & McBurney

[57] ABSTRACT

Poor transmission characteristics generally produce hue errors at low luminance levels. This comes about because of differential gain and phase effects in the transmission path between the modulator of the transmitter and the demodulator of the receiver. The hue control may be set such that high luminance flesh colors will be acceptably correct, but the dark areas often are incorrect with objectionable green tinges being present, especially in close-ups of dark skin, hair and shadow areas. This problem is overcome by automatically increasing the demodulation angle at low luminance levels. A signal that varies in accordance with the luminance level automatically adjusts a phase shift network to effect a phase shift of the chrominance signal relative to the reference signal or vice versa prior to these signals being applied to the chroma demodulators.

7 Claims, 3 Drawing Figures

DYNAMIC HUE CONTROL NETWORKS

BACKGROUND OF THE INVENTION

This invention relates to dynamic hue control networks. More particularly, this invention relates to dynamic hue control networks that are adapted to automatically vary hue dependent upon the level of the luminance component of the composite television signal.

By government regulation in North America a composite colour television signal comprises a luminance component, a chrominance component and a synchronising reference burst component. The luminance component is amplitude modulated on a carrier and contains information relating to the brightness of the image that is being telecast. The chrominance information is carried on a 3.58 MHz sub-carrier. This sub-carrier is amplitude modulated in respect of the degree of colour saturation and phase modulated in accordance with the tint of the colour. The colour sync bursts are transmitted only during the blanking intervals for the horizontal scan lines and provides a means whereby the reference signal can be reconstructed at the receiver.

The function of the sync bursts is to provide reference phase information. The locally generated reference signal must be in phase with the transmitted sub-carrier if the true hue of the telecast image is to be reproduced. Phase delay and distortion of colour signals during their transmission occur frequently and, because of this, it is common practice to provide a customer operated hue control that enables the viewer to adjust the phase of the chrominance signal relative to the locally generated reference signal, or vice versa, to obtain true colour reproduction.

The problem of hue errors is particularly acute at low luminance levels. When the luminance level is low, even if the hue control is adjusted so that the high luminance flesh colours are acceptably correct, it often will be found that the dark areas are incorrect, being surrounded by green tinges.

As the angle between the chroma demodulators departs from quadrature, and specifically for angles greater than quadrature, where the greens are significantly reduced, the larger demodulation angles produce considerably more acceptable colour reproduction. This effect has been used in various automatic tint control circuits. For example, reference may be made to U.S. Pat. No. 3,562,410, issued Feb. 9, 1971. The disadvantage of these automatic tint control circuits is that colour reproduction is limited to the orange-cyan axis, which, although producing acceptable flesh tones, severely limits the reproduction of other colours, particularly greens which become cyan, and purples which become red.

It has been shown by N. W. Parker in his paper entitled "An Analysis of the Necessary Decoder Corrections for Colour Receiver Operation with Non-Standard Receiver Primaries" (IEEE Transactions-Broadcast and Television Receivers — volume 12, April 1966) that for the phosphors used in present day picture tubes, a demodulation angle of 105° is about optimum. In practice, transmission standards and cable T.V. practices do not permit the use of angles much less than 120° if objectionable greenish areas are to be avoided.

SUMMARY OF THE INVENTION

In accordance with this invention there are provided automatic hue control networks wherein the demodulation angles are automatically increased at low luminance levels to reduce the green tinge problem noted beforehand, while retaining a greater range of correct colour reproduction for high luminance levels.

In accordance with this invention there is provided, in a colour television receiver comprising means responsive to a composite colour television signal, which signal includes a luminance component and a colour subcarrier component modulated with chrominance information, for reconstituting a colour image, which means include a demodulator coupled to a source of chrominance signal and to a source of colour reference signal for developing a colour control signal, means for automatically increasing the phase angle between said reference signal and said chrominance signal when said luminance signal moves toward a signal representing black and for automatically decreasing said phase angle when said luminance signal moves toward a signal representing white, the last mentioned means including a variable phase shift network for varying said phase angle, means for deriving a signal that varies with the level of said luminance signal, and means for applying the derived signal to said variable phase shift network to automatically vary the phase shift imparted by said network such that said phase angle increases and decreases as said luminance signal moves towards signals representing black and white respectively.

DETAILED DESCRIPTION OF THE INVENTION INCLUDING THE PREFERRED EMBODIMENTS

Figure 1:
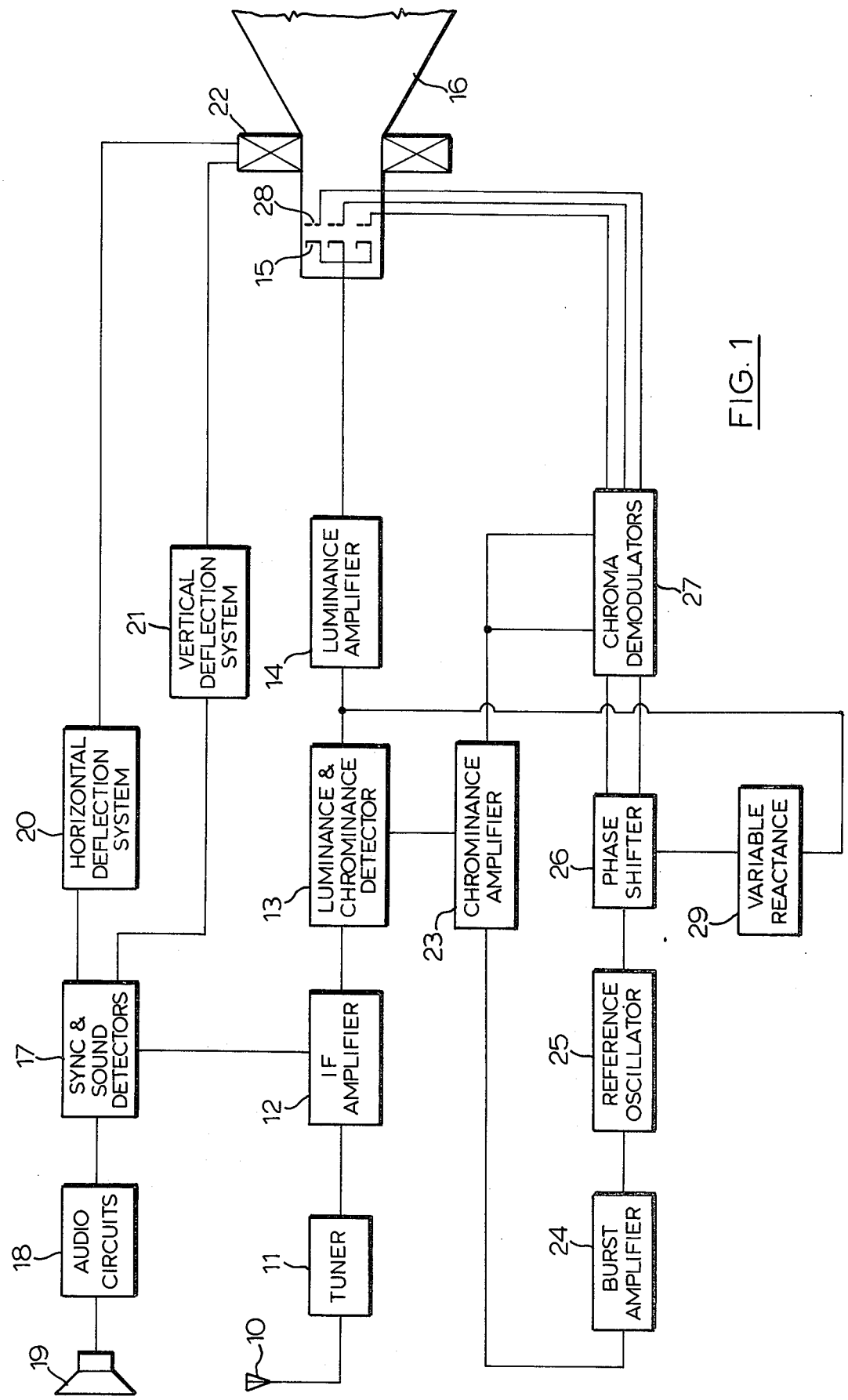
FIG. 1 is a block diagram of a colour television receiver showing one embodiment of the invention.

With the exception of circuitry which has been added in accordance with this invention, the colour television receiver shown in FIG. 1 is essentially conventional in nature, so only a brief description of how it is constituted and its mode of operation is necessary.

The transmitted signal is picked up by an antenna 10 and is processed in a tuner 11 that includes the usual R.F. amplifying and heterodyning stages for developing an I.F. signal that is amplified by an I.F. amplifier 12. The amplified I.F. signal is applied to a luminance and chrominance detector 13 wherein luminance information and chrominance information, the latter being in the form of a composite signal, is derived. The luminance component is amplified by a luminance amplifier 14 and is applied to the cathodes 15 of a three gun colour television picture tube 16.

The I.F. signal is also applied to a sync and sound detector 17 that derives both synchronising and sound components. The sound components are applied to conventional audio circuits 18. In these circuits the sound components are demodulated and amplified before being applied to a speaker 19.

The synchronising information in the form of horizontal and vertical sync pulses is applied to horizontal and vertical deflection systems 20 and 21 which generate sawtooth scanning signals to drive a deflection yoke 22 mounted on the neck of the cathode ray tube 16.

The chrominance signal is processed in a chrominance channel that includes a chrominance amplifier 23, a burst amplifier 24, a reference oscillator 25, a phase shifting network 26 and chrominance demodulators 27. The chrominance channel develops three colour difference signals generally referred to as B-Y, R-Y and G-Y that are applied to the control grid electrodes 28 of cathode ray tube 16.

The chrominance signal is amplified by chrominance amplifier 23, the amplified signal being applied to two of the input terminals of synchronous demodulator 27.

Synchronising bursts of sub-carrier frequency borne by the chrominance signal are derived by chrominance amplifier 23 and are amplified by burst amplifier 24. Amplifier 24 is gated by a signal from the deflection circuitry and applies its output to reference oscillator 25 that includes suitable phase comparison circuitry for generating a 3.58 MHz continuous wave demodulation signal that is synchronised in phase and frequency to the sync burst. The output of reference oscillator 25 is applied to a phase shifter 26 which derives two phase displaced reference signals that are applied to synchronous demodulator 27.

Figure 3:
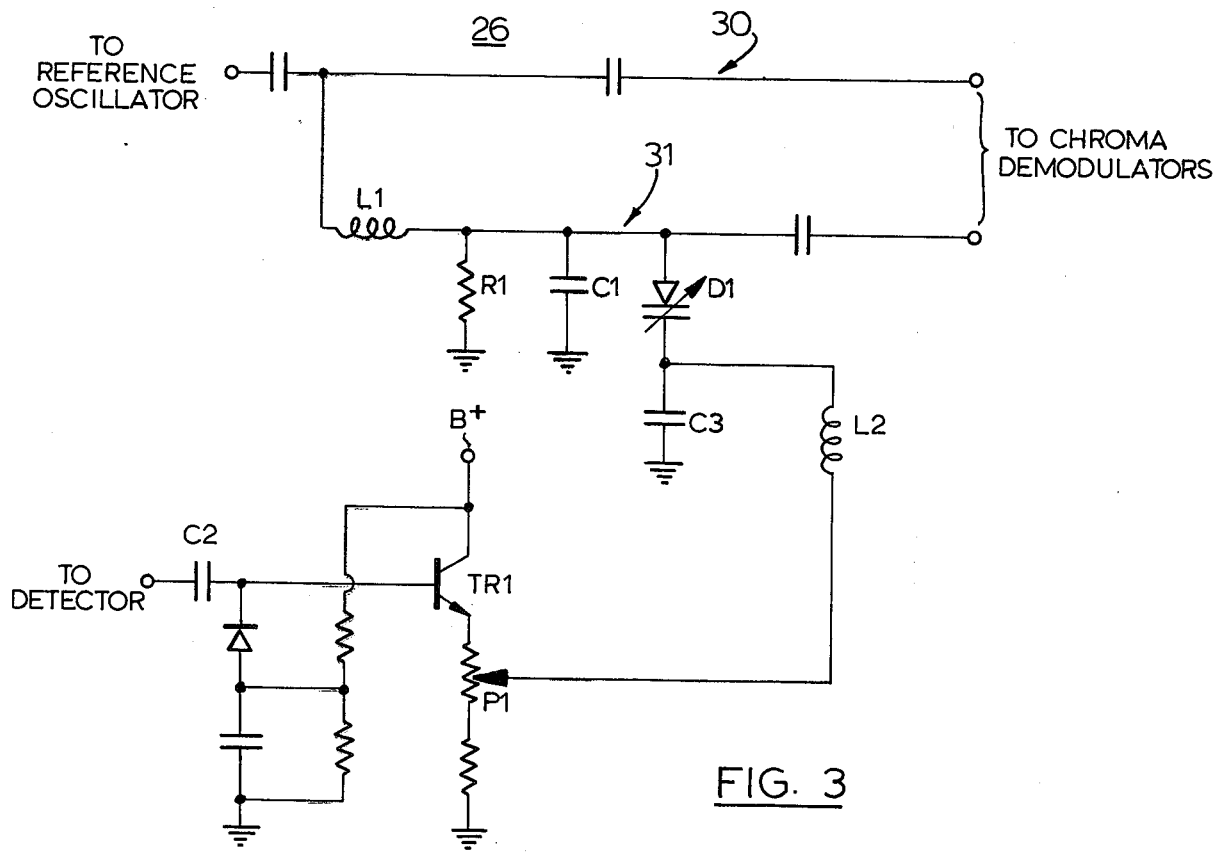
FIG. 3 is a circuit diagram showing the first embodiment of the invention in greater detail.

In accordance with one embodiment of this invention, a variable reactance network 29 is associated with phase shift network 26, as will be more clear from a consideration of FIG. 3, to which reference is now made.

As seen in FIG. 3, phase shift network 26 is constituted by two channels 30 and 31. Channel 30 may be considered to carry the R-Y reference signal, while channel 31 may be considered to carry the B-Y reference signal. Channel 31 includes an inductance coil L1, a resistor R1 and a capacitor C1 connected as shown. These components constitute a phase shifting network that typically may produce a 105° phase lag of the B-Y reference signal.

The luminance component of the video signal is coupled via a capacitor C2 to the base electrode of a transistor TR1. The base electrode of transistor TR1 is clamped so that the black level of the luminance signal is established at a specified voltage. A portion of the luminance signal that is derived at potentiometer P1 in the emitter circuit of transistor TR1 is applied via a low pass filter constituted by an inductance coil L2 and a capacitor C3 to a varactor diode D1. The filter removes video signals above about 1 MHz, thus preventing any high frequency luminance or chrominance information in the luminance channel from affecting the chrominance detector. These high frequency signals are not required in any event since the highest chrominance modulation frequency for equiband operation is 0.6 MHz.

The signal which is applied to varactor diode D1 increases its capacitance for black signals. This increased capacitance is in parallel with capacitor C1 and consequently increases the delay or phase shift of channel 31, i.e. increases the phase shift of the B-Y reference signal. This results in a wider demodulation angle for the chrominance signals at black levels. On the other hand, when the luminance signal is at a high level for colours such as yellow, cyan and green, the voltage across varactor diode D1 will increase, reducing its capacitance and resulting in a narrower demodulation angle with more accurate reproduction of these colours.

It should be noted that in the case where a phase lead is applied to one demodulator and a phase lag is applied to the other demodulator, the dynamic hue control network of this invention can readily be rearranged to change the degree of both lead and lag so as to change the demodulation angle.

Figure 2:
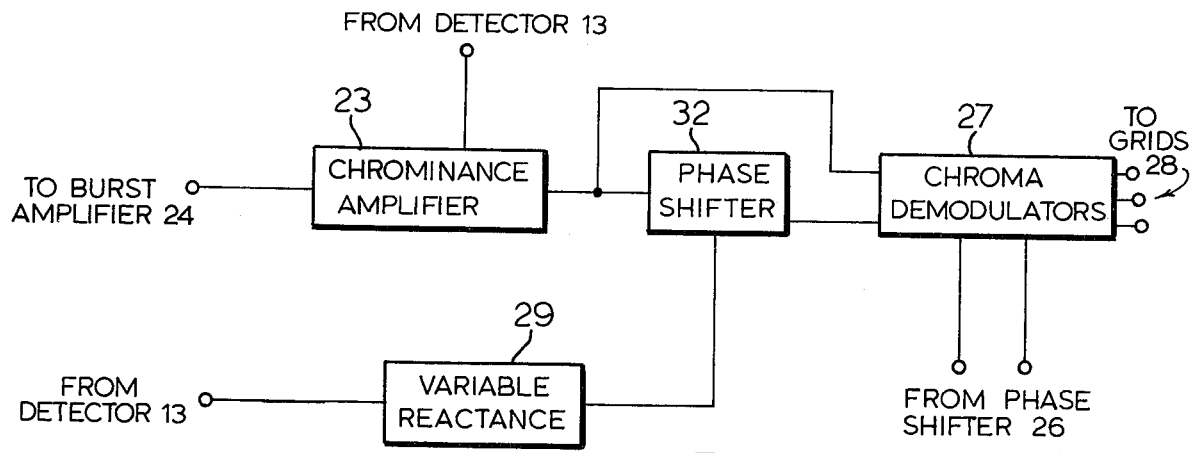
FIG. 2 is a block diagram of a part of a colour television receiver illustrating a second embodiment of this invention.

In the embodiment of the invention shown in FIG. 2, variable reactance network 29 of FIG. 1 is removed and becomes associated with a phase shift network 32 that is included between chrominance amplifier 23 and one of its inputs to synchronous demodulator 27. In this embodiment of the invention the phase of the chrominance signal relative to the phase of the reference oscillation is varied, whereas in the embodiment of the invention shown in FIGS. 1 and 3 the phase of the reference oscillation in channel 31 is varied relative to the phase of the chrominance signal.

While one form of variable reactance network using a varactor diode has been shown and described, it is to be understood that any active device which changes its effective reactance in response to changes in the luminance signal level can be used. Thus, in the case where the phase shift network is sensitive to changes in resistance to vary the degree of phase shift, a voltage dependent resistor could be used.

It also should be understood that this invention is not limited to a colour receiver in which R-Y, B-Y and G-Y signals are derived from demodulator. It applies to colour receivers generally including those using the R, G, B chrominance signal system.

While preferred embodiments of this invention have been disclosed herein, those skilled in the art will appreciate that changes and modifications may be made therein without departing from the spirit and scope of this invention as defined in the appended claims.

What I claim as my invention is:

1. In a colour television receiver comprising means responsive to a composite colour television signal, which signal includes a luminance component and a colour subcarrier component modulated with chrominance information, for reconstituting a colour image, which means include a demodulator coupled to a source of chrominance signal and to a source of colour reference signal for developing a colour control signal, means for automatically increasing the phase angle between said reference signal and said chrominance signal when said luminance signal moves toward a signal representing black and for automatically decreasing said phase angle when said luminance signal moves toward a signal representing white, the last mentioned means including a variable phase shift network for varying said phase angle, means for deriving a signal that varies with the level of said luminance signal, and means for applying the derived signal to said variable phase shift network to automatically vary the phase shift imparted by said network such that said phase angle increases and decreases as said luminance signal moves towards signals representing black and white respectively.

2. A colour television receiver according to claim 1 wherein said phase shift network includes a variable reactance device and said derived signal is applied thereto.

3. A colour television receiver according to claim 2 wherein said device is a varactor diode.

4. A colour television receiver according to claim 2 wherein said phase shift network is connected between said source of colour reference signal and said demodulator.

5. A colour television receiver according to claim 2 wherein said phase shift network is connected between said source of chrominance signal and said demodulator.

6. A colour television receiver according to claim 4 wherein said device is a varactor diode.

7. A colour television receiver according to claim 5 wherein said device is a varactor diode.

* * * * *